(12) United States Patent
Winter

(10) Patent No.: US 8,201,515 B1
(45) Date of Patent: Jun. 19, 2012

(54) ANCHOR FOR MARKER BUOY, WATERFOWL DECOY AND THE LIKE

(76) Inventor: Lynn A. Winter, Bloomington, MN (US)

( * ) Notice: Subject to any disclaimer, the term of this patent is extended or adjusted under 35 U.S.C. 154(b) by 494 days.

(21) Appl. No.: 12/381,281

(22) Filed: Mar. 10, 2009

(51) Int. Cl.
B63B 21/24 (2006.01)
(52) U.S. Cl. .................................................. 114/294
(58) Field of Classification Search .......... 114/294, 114/299; 441/1, 6, 21, 23, 28; 43/3; 81/318, 81/320; 24/3.12, 67 R, 67.7, 499, 557; 269/37; 248/451; 439/219; 211/89.01
See application file for complete search history.

(56) References Cited

U.S. PATENT DOCUMENTS

| | | | |
|---|---|---|---|
| 1,993,974 A | | 3/1935 | McVicker |
| 2,002,001 A | * | 5/1935 | Beard ............................. 24/557 |
| 2,632,930 A | * | 3/1953 | Donahue ....................... 24/344 |
| 2,747,315 A | | 5/1956 | Clemas |
| 2,813,363 A | | 11/1957 | Loeckner |
| 3,204,313 A | * | 9/1965 | See ................................. 24/557 |
| 3,402,442 A | * | 9/1968 | Kruger et al. .................. 24/557 |
| 3,653,085 A | | 4/1972 | Rovner |
| 3,967,346 A | | 7/1976 | Young, Jr. |
| D244,772 S | | 6/1977 | Zongker |
| 4,057,313 A | | 11/1977 | Polizzano |
| 4,067,287 A | * | 1/1978 | Sabella ......................... 114/299 |
| D259,035 S | | 4/1981 | Greenhawk, Sr. |
| 4,443,203 A | | 4/1984 | Maertens |
| 4,501,563 A | | 2/1985 | Johnson et al. |
| 4,544,364 A | | 10/1985 | Bankston |
| 4,602,588 A | * | 7/1986 | MacLean ...................... 114/301 |
| 4,757,630 A | | 7/1988 | Torberg |
| 4,813,107 A | | 3/1989 | Cetrone |
| 4,827,653 A | | 5/1989 | Sewell |
| D317,116 S | | 5/1991 | Nimtz |
| D322,390 S | | 12/1991 | Nimtz et al. |
| 5,079,808 A | | 1/1992 | Brown |
| 5,154,131 A | | 10/1992 | Hall |
| 5,168,650 A | | 12/1992 | Martin |
| 5,188,551 A | | 2/1993 | Keller |
| 5,230,637 A | | 7/1993 | Weber |
| 5,256,093 A | | 10/1993 | Balstad |
| D348,716 S | | 7/1994 | Sbrocchi |
| D350,892 S | | 9/1994 | Sorensen |
| 5,367,813 A | | 11/1994 | Cherry |
| 5,376,035 A | | 12/1994 | Forrest |
| 5,461,816 A | | 10/1995 | Gazalski |
| 5,613,888 A | | 3/1997 | Lamphere |

(Continued)

*Primary Examiner* — Daniel Venne

(57) ABSTRACT

An improved anchor (20) for securing the floatation units (12) of marker buoys (10), waterfowl decoys (36), and the like at selected locations on a body of water. The anchor (20) has an anchor weight (24) portion of non-lead material and a pair of clamping arms (30) extending outwardly from the anchor body (22), and configured and adapted to springably spread apart to open, to close about, and to releasably clamp onto the floatation unit (12), thus preventing the release and tangling of anchor line (14). This provides convenient storage for the marker buoy (10) or the waterfowl decoy (36) with its wound anchor line (14) and the attached anchor (20). Currently, marker buoy anchors and waterfowl decoy anchors frequently consist of a thin lead strip capable of being bent around a portion of the floatation unit (12) of the marker buoy (10) or the waterfowl decoy (36) for secure storage. For use, the lead strip can be unbent to release it from the floatation unit (12). My present invention is uncomplicated, easy to use, and easy to manufacture. It provides a superior alternative to the current technique of using bendable lead anchors, thus eliminating the need for this particular use of lead, a potential source of pollution.

4 Claims, 5 Drawing Sheets

U.S. PATENT DOCUMENTS

| | | | |
|---|---|---|---|
| 5,640,742 A | 6/1997 | White et al. | |
| 5,822,907 A | 10/1998 | Lukey | |
| 5,845,889 A | 12/1998 | Suzuki | |
| 5,875,583 A | 3/1999 | Church | |
| 5,899,014 A | 5/1999 | Bornhoft et al. | |
| 5,937,485 A | 8/1999 | Dittmer | |
| D456,336 S * | 4/2002 | Briles | D12/215 |
| 6,543,176 B1 | 4/2003 | McGhghy | |
| 6,601,838 B1 | 8/2003 | Gilley | |
| D483,434 S | 12/2003 | White | |
| D487,688 S | 3/2004 | Brass et al. | |
| 6,857,216 B1 | 2/2005 | Merin | |
| 6,871,387 B2 | 3/2005 | Cheng et al. | |
| 6,973,859 B2 | 12/2005 | Noniewicz | |
| 7,107,881 B1 | 9/2006 | Liou | |
| 7,475,509 B2 | 1/2009 | Cagle | |
| 7,819,712 B1 * | 10/2010 | Winter | 441/6 |
| 2002/0157299 A1 | 10/2002 | Barrett | |
| 2003/0173445 A1 | 9/2003 | Lebens | |
| 2004/0163300 A1 | 8/2004 | Pinkston | |
| 2005/0022440 A1 | 2/2005 | Pinkston | |
| 2006/0162228 A1 | 7/2006 | Sieman | |
| 2006/0242883 A1 | 11/2006 | Tilby | |

* cited by examiner

ANCHOR FOR MARKER BUOY, WATERFOWL DECOY AND THE LIKE

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates generally to the weighted anchors used with marker buoys by fisherman and boaters to mark particular selected locations, and by hunters to anchor buoyant waterfowl decoys on a body of water.

BACKGROUND OF THE INVENTION

Weighted anchors are frequently employed by fishermen, boaters and others to maintain positioning of floating marker buoys used to mark underwater objects or selected locations on the surface of a body of water. Similar sized weighted anchors are also often employed by waterfowl hunters to tether their floating decoys at selected locations on the water surface.

Marker buoy anchors can be used to mark fishing areas, navigation routes, and underwater points of interest. Marker buoys in general use often consist of a floatation unit connected to one end of an anchor line, with the other end of the anchor line tied to a weighted anchor. In use, the marker buoy and the anchor are tossed or placed onto the water surface, and the anchor line pays out as the anchor descends to the bottom of the water body.

The anchors of currently available marker units are typically of a homogeneous material with high specific gravity such as lead or steel. Steel anchors are often U-shaped to allow them to be conveniently placed over the wound line on the anchor line spool of the floatation unit for compact and tangle-free storage. Lead anchors have a slightly higher specific gravity than steel, but their primary advantage over steel is their malleable quality. When shaped as a rectangular strip, these anchors can be manually bent and formed around the anchor line spool or other part of a marker buoy for neat and secure storage. They stay in place on the floatation unit and prevent the anchor line from unwinding or getting tangled. To be disengaged from the floatation unit for use, they are easily unbent to free them.

U.S. Pat. No. 4,443,203 issued to Maertens on Apr. 17, 1984; U.S. Pat. No. 4,501,563 issued to Johnson et al. on Feb. 26, 1985; U.S. Pat. No. 4,544,364 issued to Bankston on Oct. 1, 1985; and U.S. Pat. No. 5,188,551 issued to Keller on Feb. 23, 1993, all disclose examples of anchors composed of bendable lead so that they can be formed around the marker body for storage when not in use. They all have one major disadvantage. Lead is a serious pollutant. Lead shot used in shotgun loads is being replaced by shot made of steel, bismuth, and other materials. Lead bullets sometimes fragment and cause problems when ingested by birds and animals. In recent years, efforts have begun to replace lead fishing sinkers with steel sinkers. When a marker buoy is in use, the anchor line can be accidentally severed, severed from abrasion, or severed after deterioration over time. When this occurs, the anchor is likely to be abandoned on the bottom of the water body constituting a pollutant. If the marker buoy with its lead anchor eventually ends up in a landfill, the lead can be a pollutant there also.

Steel, while considered much less of a pollutant, is less frequently used as an anchor material, because it doesn't have the malleability to be easily bent around the marker buoy to clamp onto the marker buoy to prevent tangling of the anchor line when it is not being used.

Decoy anchors are used by waterfowl hunters to keep their floating decoys at the selected locations and in the pattern of which they were positioned on the water surface. Floating waterfowl anchors usually have a length of cord attached to their keel at one end, and an anchor attached at the other end. When not being used, these decoys are typically stored with the anchor cord wound around the decoy or its keel, and with the anchor secured to some portion of the decoy or its keel. Often the anchor is a thin lead strip that can be bent around the neck or keel of the decoy to hold it in place for storage. But the repeated bending and unbending can cause the lead anchor to break. Lead anchors also have the disadvantage of being a serious pollutant. With the large number of decoys employed by many hunters and frequent broken anchor lines, many of these lead anchors may not be recovered from the bottom of the water body.

To use the decoy, the anchor is disengaged from the decoy body, and the anchor and decoy are tossed or placed onto the water surface. The anchor, which is attached to the decoy by a fixed length of decoy cord, sinks to the bottom, thus preventing the decoy from drifting very far from its initial position on the water surface. A small amount of slack is usually provided in the decoy cord to allow the decoy to move in a life-like manner.

Decoy anchors are generally made of high specific gravity materials such as lead or steel. An essential feature of decoy anchors is that they must function in combination with their attached decoys to be tangle-free while in use, while in transport, and while in storage.

Decoy anchors are often used and stored in large quantities, and tangling of the anchors and cords is a particularly annoying and bothersome problem. Decoys are often set out or retrieved in the dark, and sometimes during cold weather. These adverse conditions tend to exacerbate the difficulty if cords and anchors get intertwined or tangled. Another problem occurs with loose fitting anchors or with anchors that become separated from their attachment point on the decoy. These loose anchors can strike the decoys and damage their finishes.

Over many years, waterfowl hunters and other practitioners have devised and revised various methods and decoy/anchor arrangements to minimize the potential for tangling. Most of these methods involve winding the anchor cord around the body or keel of the decoy, and then securing the anchor to some part of the decoy. Some designs include reels to deploy and retrieve the anchor cord. Malleable lead shapes have very often been used for decoy anchors, because thin lead can be bent and formed around the neck, bill, or keel of the decoy when not in use. When steel anchors have been used, they have often been configured to fit over the neck of the decoy, or they may be secured by an elastic band or other means to the keel of the decoy.

U.S. Pat. No. 5,461,816 issued to Gazalski on Oct. 31, 1995; U.S. Pat. No. 5,899,014 issued to Bornhoft et al. on May 4, 1999; U.S. Pat. No. 6,543,176 issued to McGhghy on Apr. 8, 2003; and U.S. Pat. No. 6,857,216 issued to Merin on Feb. 22, 2005, all disclose anchors designed to prevent anchor line tangling when used for waterfowl decoys.

The Gazalski anchor is plastic and filed with shot, sand, water and sand or other materials. The anchor slides onto the keel of the decoy for storage, but the keel must be shaped and adapted uniquely to receive and grip this anchor. The decoy keel and the anchor must be designed to fit in combination. Thus, this anchor would not likely fit or be properly secured with most existing decoys.

The Bornhoft et al. anchor has a clasp of deformable resilient material to grip the anchor cord after the cord is wound onto to decoy for storage. The clasp must be manually manipulated to slip onto the cord and is subject to slippage and degradation over time and use.

The McGhghy anchor has a bail, and the anchor cord is wrapped around this bail for storage. The bail end of the anchor attaches to one end of the decoy keel, and there is a stretchable band used to attach the other end of the anchor to the other end of the decoy keel. The keel of the decoy must have a notch at both ends, one notch for the bail and the other for the stretchable band. The stretchable band is a separate article that can easily become lost, and it can deteriorate with time and use. This anchor must also be matched with a particular keel configuration having the two notches to function properly. Thus, the anchor and keel must be designed in combination to fit properly. Also, having to wind the anchor cord around the bail, and using the separate stretchable band for each decoy would be somewhat time consuming if one were using a large number of decoys.

The Merin anchor cord is wrapped around the decoy keel. It has a stretchable latex tube to facilitate securing the anchor to the decoy. During storage the ball shaped anchor fits in a slot between the decoy and its keel at the rearward end of the decoy/keel. Again, the design of the decoy/keel interconnection must be configured to fit this specific ball-shaped anchor.

BRIEF SUMMARY OF THE INVENTION

The objects of the invention are:
(a) Provide a durable anchor for marker buoys, waterfowl decoys, and the like that is uncomplicated, easy to use, and easy to manufacture.
(b) Provide an anchor that is of high specific gravity and is of sufficient weight to facilitate the operation of the anchor but does not contain a significant amount of lead.
(c) Provide an anchor of streamline shape so that it does not collect soil, weeds, and other debris when in use.
(d) Provide an anchor that has the capability to releasably clamp and hold onto the floatation unit of a marker buoy or waterfowl decoy for secure storage and to prevent the unwinding and tangling of the anchor line when it is not being used. There is a need for a non-lead anchor for marker buoys, waterfowl decoys, and the like, having the capability of releasably clamping and holding onto the marker buoy or waterfowl decoy when the anchor is not being used.
(e) Provide an anchor that the user can easily release from its storage position on the marker buoy or waterfowl decoy for use.

This invention is an anchor for use with a marker buoy, waterfowl decoy, or the like. It is of a generally U-shaped configuration having a weighted portion and two outwardly extending, opposed, springable arms shaped and adapted to clamp and hold onto the floatation unit of a marker buoy or waterfowl decoy to prevent the release and tangling of anchor line, and for convenient storage when not in use. In order to provide proper operation, the anchor is composed substantially of high specific gravity material and is of sufficient weight to hold the floatation unit of a marker buoy or waterfowl decoy at a location nearly directly above the anchor, despite the action of wind, waves, or currents. This anchor is of non-lead material and does not rely on the malleable characteristic of lead to be bent and formed around a portion of the floatation unit of a marker buoy or waterfowl decoy when not in use. This eliminates the use of lead, a commonly used material for marker buoy and decoy anchors, and a potential source of pollution.

The advantages of the invention are:
(a) This anchor is quite simple and easy to manufacture and use.
(b) Currently available anchors are often made of thin leads strips such that they can be easily bent and formed around some portion of a marker buoy or decoy for secure, tangle-free storage. However the anchor of this invention can be made of corrosion-resistant steel. It does not rely on the use of malleable lead, a serious pollutant, to be formed around a portion of the floatation unit of a marker buoy or decoy.
(c) This anchor has the capability to releasably clamp and hold onto the floatation unit of a marker buoy or decoy for secure storage, and to prevent the unwinding and tangling of the anchor line when it is not being used.

These and other objects, features, aspects, and advantages of the invention will become more clearly understood from the following detailed description when read together with the claims and drawings.

DRAWING REFERENCE NUMERALS OF THE COMPONENTS

|    | Component |
|----|-----------|
| 10 | marker buoy |
| 12 | floatation unit |
| 14 | anchor line |
| 20 | anchor |
| 22 | anchor body |
| 24 | segmented anchor weight |
| 25 | integral anchor weight |
| 26 | spring |
| 28 | elongated stiffener |
| 30 | arm |
| 32 | shell cover |
| 34 | anchor line connection member |
| 36 | waterfowl decoy |

DETAILED DESCRIPTION OF THE INVENTION

Figure 1:
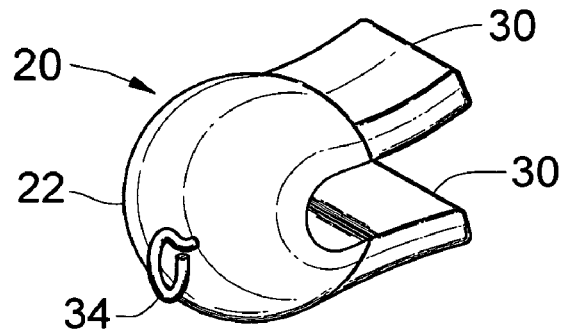
FIG. 1 is a perspective view of the first embodiment of the anchor according to the invention.

Referring to the drawings in detail wherein like numerals designate like parts, and with particular reference to FIG. 1, the first embodiment incorporating the concepts of the invention of an anchor, generally designated by reference numeral 20, is shown in a perspective view. Anchor 20 of this invention is designed to be used with marker buoys, floating waterfowl decoys, and the like.

Figure 2:
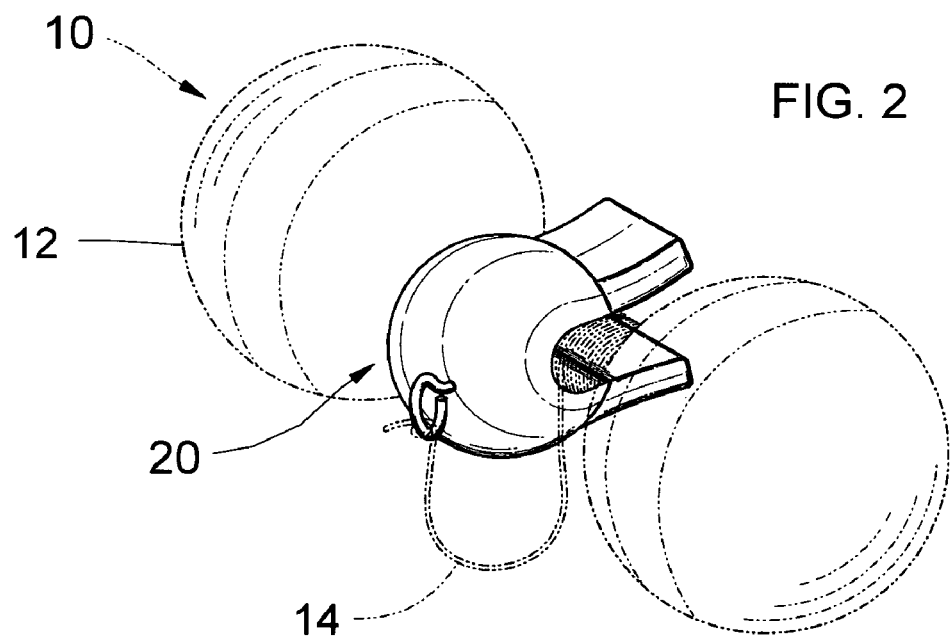
FIG. 2 is an overall perspective view that depicts the first embodiment of the invention in the ready, standby, or storage condition with the anchor releasably clamped onto the floatation unit of a marker buoy, and tied onto the anchor line of a commonly available marker buoy. The marker buoy and anchor line are shown in phantom and are not part of the invention.

As illustrated in FIG. 2, an anchor line 14 is connected to one end of the floatation unit 12 of a marker buoy 10, and at its other end to an anchor line connection member 34 at the base end or some other point of anchor 20. Floatation unit 12 is the floating portion of a marker buoy, waterfowl decoy, or the like. Anchor line connection member 34 is composed of steel or other high strength material, shaped as an eye, ring, snap, or other effective means of providing a strong, secure attachment to anchor line 14 by using a knot or equivalent connection. Anchor 20 of this embodiment is of a modified u-shaped configuration with an enlarged anchor body 22 and a pair of spaced, opposed clamp members, gripping claws, or arms 30 extending outwardly from anchor body 22. Anchor body 22, with its two integral arms, has an outer shell cover 32. Shell cover 32 is composed of flexible, abrasion-resistant material that can be repeatedly bent without degradation such as polyethylene-tere-phthalate, polypropylene, vinyl, nylon, hard rubber or other plasticized materials, and it contains segmented anchor weight 24.

Figure 3:
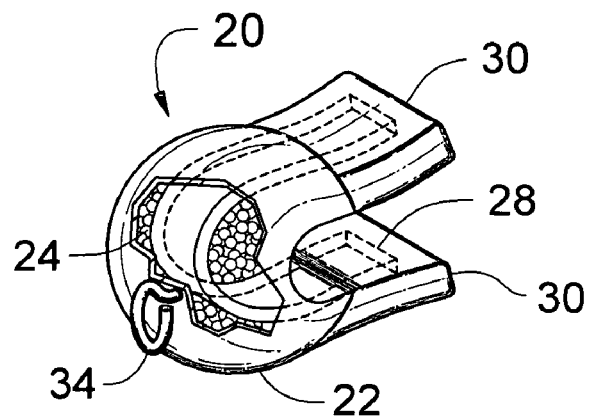
FIG. 3 is a perspective view of the first embodiment of the invention with a cut-away view showing the segmented anchor weight comprising a multitude of rounded anchor weight segments and the elongated stiffener enclosed within the anchor shell cover.
Figure 4:
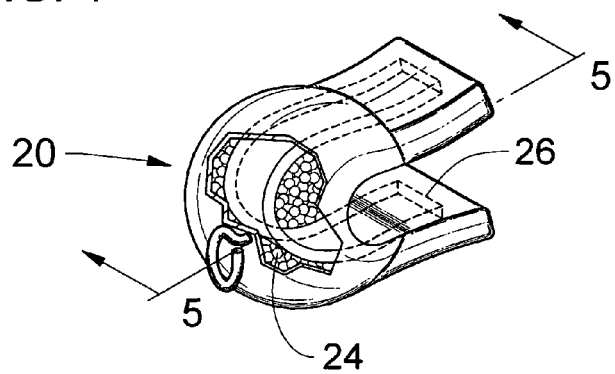
FIG. 4 is a perspective view of the second embodiment of the invention, similar to FIG. 3, comprising a multitude of rounded anchor weight segments but having a leaf spring and no elongated stiffener.

FIG. 3 is a perspective view of anchor 20 with a cut-away view showing segmented anchor weight 24 and at least one elongated stiffener 28 positioned inside of shell cover 32. Segmented anchor weight 24 is composed of non-lead material having a specific gravity of at least 4.0, such as iron, steel, or mineral aggregate, and is of sufficient weight to confine floatation unit 12 to a small area on the water surface nearly directly above anchor 20 when anchor 20 is deployed at the bottom of the water body. Segmented anchor weight 24 comprises a plurality of individual anchor weight segments that are substantially rounded and have generally smooth surfaces to allow these individual anchor weight segments to easily slide against adjacent surfaces of one another for the purpose of allowing anchor 20 and arms 30 to easily flex.

Elongated stiffener 28 traverses through the interior of anchor body 22 and extends longitudinally through the interior of at least one-half of the length of arms 30, and is composed of malleable steel, plastic, or other suitable material that can be easily and repeatedly manually bent and unbent without degradation. Elongated stiffener 28 has a cross-sectional configuration with sufficient stiffness to allow arms 30 to clamp and hold onto floatation unit 12 without easily becoming dislodged therefrom when not in use. Elongated stiffener 28 allows arms 30 to be easily and repeatedly bent to partially close together about floatation unit 12 to clamp and hold onto floatation unit 12 to prevent the inadvertent release and tangling of anchor line 14, and to provide convenient storage of floatation unit 12, anchor line 14, and anchor 20 when not in use. Elongated stiffener 28 also allows arms 30 to be easily and repeatedly unbent to spread apart to release anchor 20 from floatation unit 12. Arms 30 may be angled slightly outward from each other or they may have recurved tips to facilitate urging arms 30 apart when positioning anchor 20 onto floatation unit 12.

When the user wants to use marker buoy 10 or waterfowl decoy 36 and anchor 20, he or she grasps floatation unit 12 in one hand and grasps anchor body 22 in the other hand. Then he or she pulls anchor 20 outwardly away from floatation unit 12, thus urging arms 30 and elongated stiffener 28 to bend and spread outwardly apart as arms 30 slide off from floatation unit 12, resulting in the release of anchor 20 from floatation unit 12. When arms 30 are free of floatation unit 12, floatation unit 12 and anchor 20 are ready for deployment. This bending of elongated stiffener 28 and arms 30 is facilitated by the contained segmented anchor weight 24 being of segmented form, and the segments having sufficiently smooth surfaces to allow them to slide against each other as arms 30 flex.

The user can then place or toss floatation unit 12 and anchor 20 onto the water surface at a selected location. Gravity will cause anchor 20 to descend downwardly until anchor 20 reaches the bottom of the water body. Anchor 20, being of sufficient weight, will then hold floatation unit 12 in close proximity to its selected position on the water surface despite the action of wind, waves, or currents.

When the user wants to discontinue use and return anchor 20 to its storage position on floatation unit 12, he or she retrieves floatation unit 12 and rewinds anchor line 14 thereon. Then the user grasps floatation unit 12 in one hand and grasps anchor body 22 in the other hand and pushes the two outward ends of arms 30 against opposite sides of the attachment point of floatation unit 12. With arms 30 being in the outwardly bent position, arms 30 easily slide over the opposite sides of the attachment point of floatation unit 12. When arms 30 are in position, the user manually bends arms 30 along with elongated stiffener 28 back to the substantially closed position, closing about, loosely gripping, and holding onto floatation unit 12, thus preventing the inadvertent release and tangling of anchor line 14. This provides a convenient and secure storage arrangement for floatation unit 12 with its wound anchor line 14 and its attached anchor 20.

Figure 5:
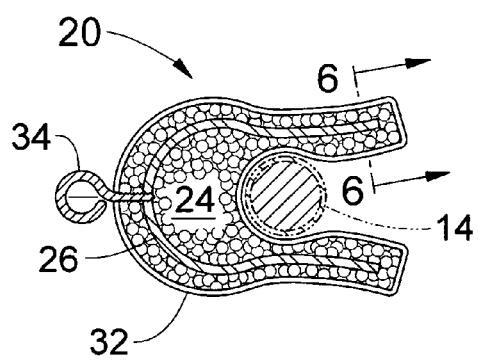
FIG. 5 is a side sectional view of the second embodiment of the'invention, having a leaf spring, taken along Line 5-5 of FIG. 4.
Figure 6:
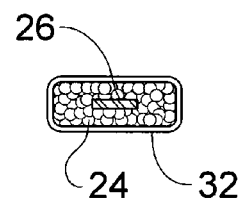
FIG. 6 is and end sectional view of one arm of the second embodiment of the invention taken along Line 6-6 of FIG. 5.

FIG. 5 and FIG. 6 depict a second embodiment of the invention. In this embodiment, it can be seen that segmented anchor weight 24 is, again, composed of non-lead material comprising a plurality of individual anchor weight segments as described for the first embodiment. Elongated stiffener 28 is replaced with at least one spring 26. Spring 26 can be of similar configuration to that of elongated stiffener 28, but is of flexibly resilient material such as spring steel or resilient plastic material. Spring 26 can be configured as a leaf spring, bar-shaped, or circular in cross-section. Spring 26 is configured to facilitate the two arms 30 to be easily and repeatedly flexed to partially close together about the attachment point of floatation unit 12 to clamp and hold onto floatation unit 12 when not in use. Spring 26 also allows arms 30 to be easily and repeatedly flexed to springably spread apart to release anchor 20 from floatation unit 12.

When the user wants to use marker buoy 10 or waterfowl decoy 36 and anchor 20, he or she pulls anchor 20 outwardly away from floatation unit 12, thus causing arms 30 to slide over the opposite sides of the attachment point of floatation unit 12 to release anchor 20 therefrom. The user can then deploy floatation unit 12 and anchor 20 by tossing or placing them onto the water surface.

When the user wants to discontinue use and return anchor 20 to its storage position on floatation unit 12, he or she rewinds anchor line 14 onto floatation unit 12. Then the user pushes the two ends of arms 30 against opposite sides of the attachment point of floatation unit 12 causing arms 30 to springably spread apart to allow arms 30 to slide onto floatation unit 12. The closing force of spring 26 then causes arms 30 to return to their original configuration, partially closing about, loosely gripping, and holding onto floatation unit 12.

Figure 7:
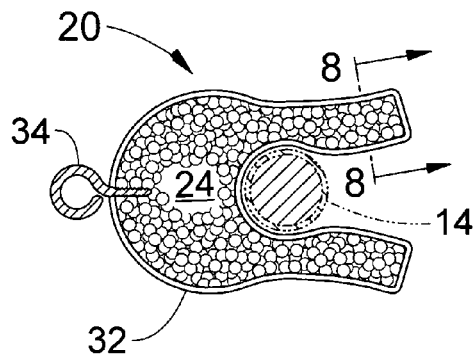
FIG. 7 is a side sectional view of a third embodiment of the invention that does not include either an elongated stiffener or a leaf spring taken along Line 5-5 of FIG. 4.
Figure 8:
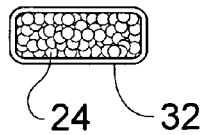
FIG. 8 is an end sectional view of one arm of the third embodiment of the invention taken along Line 8-8 of FIG. 7.

FIG. 7 and FIG. 8 depict a third embodiment of the invention. In this embodiment, segmented anchor weight 24 is, again, composed of non-lead material in segmented form as described for the first and second embodiments. The spring 26 of the second embodiment is absent, but the shell cover 32 is, itself, of flexibly resilient material to act as a spring. Anchor 20, with its integral arms 30, is therefore springably capable of releasably clamping and holding onto floatation unit 12. The material of shell cover 32 of this third embodiment can be of hard rubber, neoprene, or resilient plastic material to allow arms 30 to releasably clamp and hold onto floatation unit 12 when not in use. Except for the spring function, the second and third embodiments and their use are identical.

Figure 9:
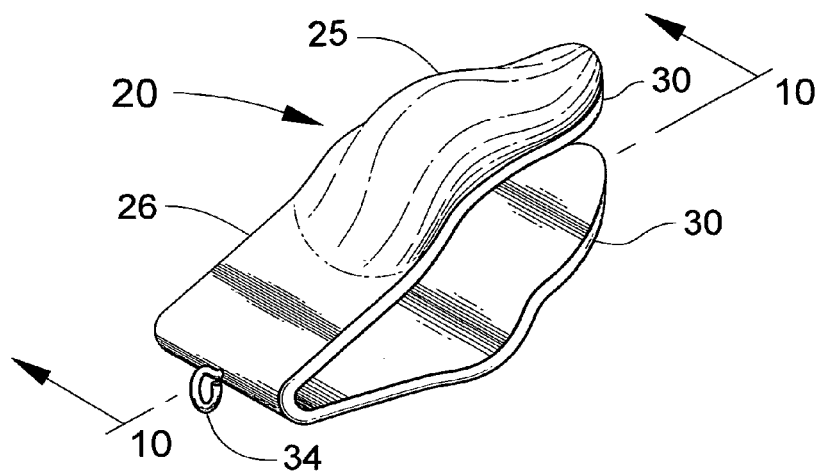
FIG. 9 is a perspective view of a fourth embodiment of the invention having an integral anchor weight attached to each of the arms of the anchor.
Figure 10:
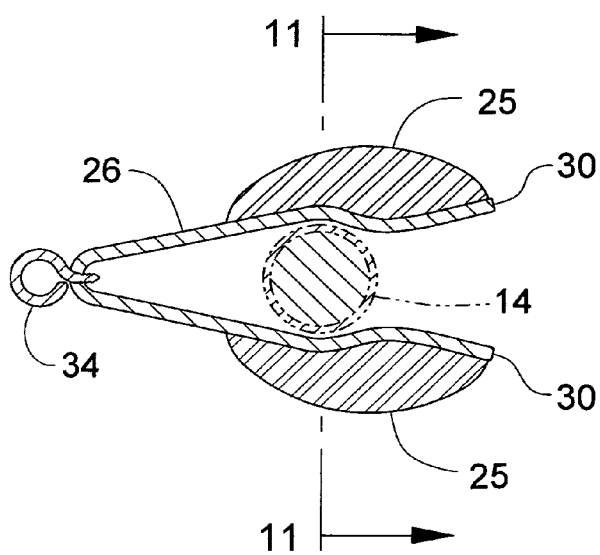
FIG. 10 is a side sectional view of the fourth embodiment of the invention taken along Line 10-10 of FIG. 9.
Figure 11:
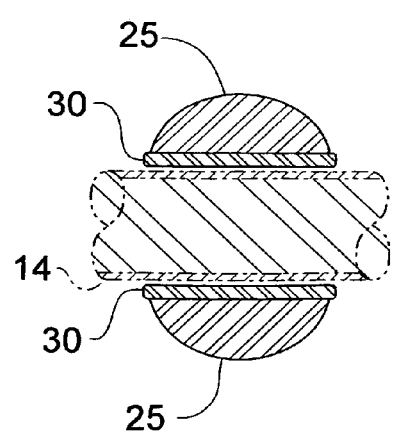
FIG. 11 is an end sectional view of the fourth embodiment of the invention taken along Line 11-11 of FIG. 10.
Figure 12:
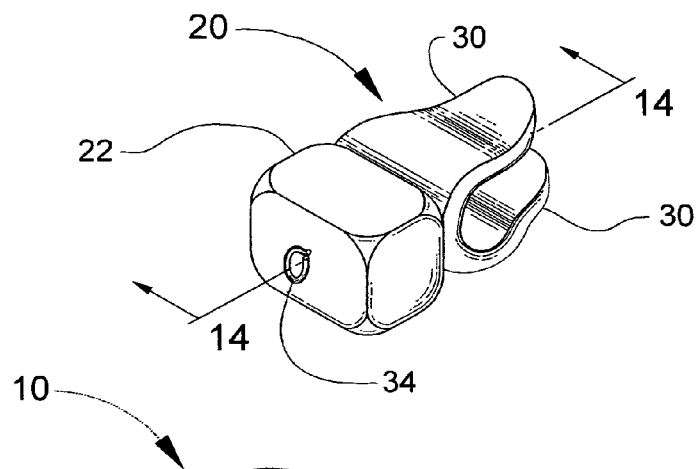
FIG. 12 is a perspective view of a fifth embodiment of the invention having the integral anchor weight attached at the rearward end of the anchor.
Figure 13:
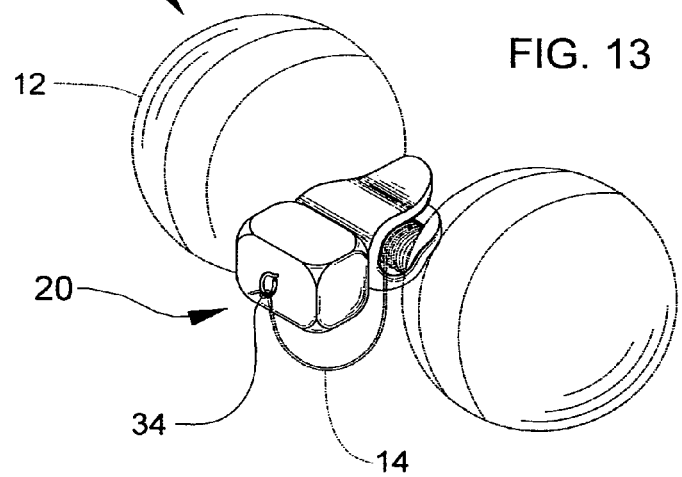
FIG. 13 is an overall perspective view of the fifth embodiment of the invention, releasably clamped onto the floatation unit of a marker buoy and tied to the marker buoy anchor line, as similarly shown in FIG. 2 for the first embodiment. The marker buoy and anchor line are shown in phantom and are not part of the invention.
Figure 14:
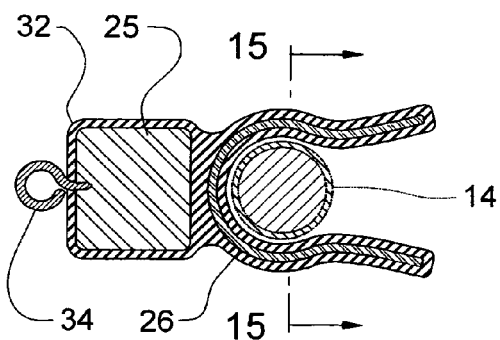
FIG. 14 is a side sectional view of the fifth embodiment of the invention taken along Line 14-14 of FIG. 1 and shows the anchor weight as an integral anchor weight.
Figure 15:
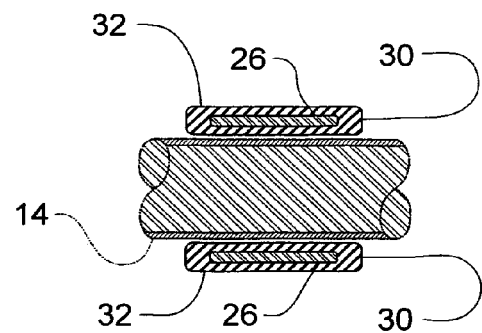
FIG. 15 is an end sectional view of the fifth embodiment of the invention taken along Line 15-15 of FIG. 14.

FIG. 9, FIG. 10, and FIG. 11 depict a fourth embodiment of the invention. In this embodiment, the anchor body consists of a spring 26 or a similarly shaped member powered by a coil spring (not shown). Spring 26 is of spring steel, resilient plastic, hard rubber, or other suitable flexibly resilient material capable of acting as a spring to releasably clamp and hold onto floatation unit 12. One or two non-lead elements of integral anchor weight 25 are fixedly attached to one or both of the arms 30. Integral anchor weight 25 can be attached to arm 30 by welding, metal fasteners, or other means of fixed permanent attachment. This embodiment of the invention does not require a shell cover 32, but may include a protective coating of flexible, abrasion-resistant plastic or other similar material. Arms 30 and spring 26 are integrally formed. Other aspects of this embodiment and its use are as described for the three previously described embodiments of the invention.

FIG. 12, FIG. 13, FIG. 14, FIG. 15, and FIG. 16 illustrate a fifth embodiment of the invention. In this embodiment, a resilient spring 26 is, again, included in the arms 30, and the non-lead integral anchor weight 25 is attached at the rearward end of the anchor 20. Spring 26 and integral anchor weight 25 are enclosed within a shell cover 32. Shell cover 32 is integrally formed with the two arms 30. In this embodiment, integral anchor weight 25 can be a single element. Spring 26 is as described for the second embodiment but can be of a slightly different configuration as shown. It should be understood that, in a variation of this embodiment, spring 26 can be absent (not shown absent in drawings) if arms 30 are, themselves, composed of flexibly resilient material capable of springably clamping and holding onto floatation unit 12. Other aspects of this embodiment and its use are as described for the previously described embodiments of this invention.

Figure 16:
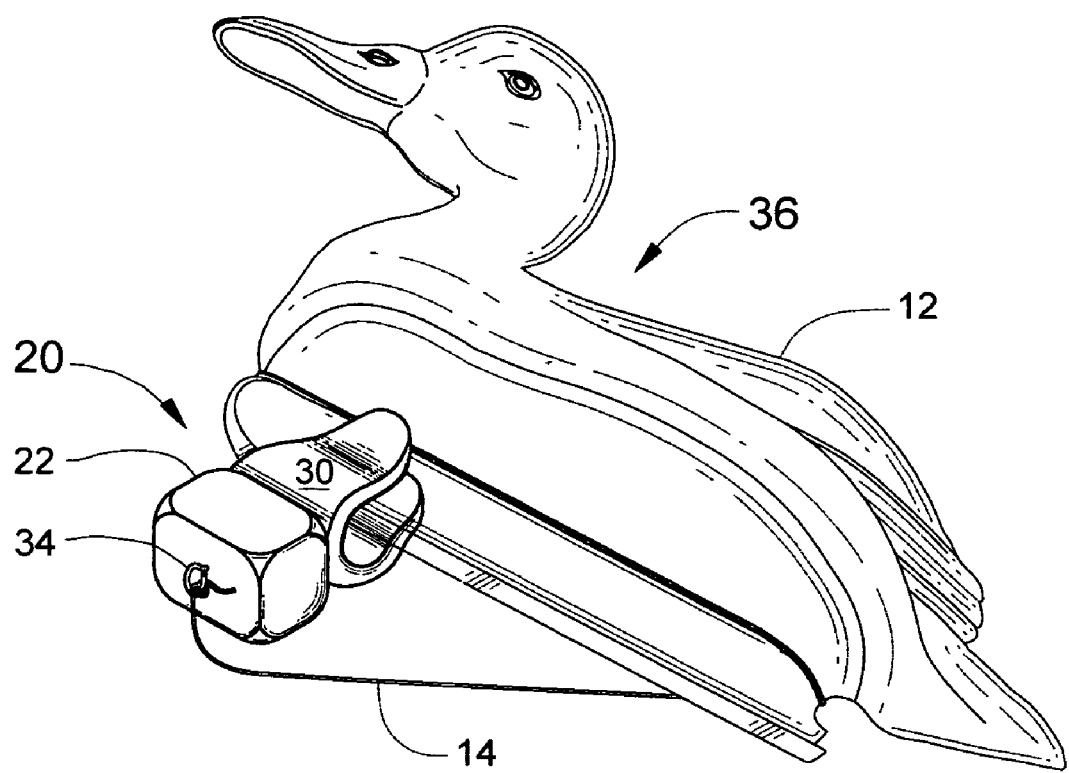
FIG. 16 is an overall perspective view of the 5th embodiment of the invention releasably clamped onto the floatation unit of a typical waterfowl decoy, and attached to the keel of the decoy, as similarly shown in FIG. 13 where the anchor is releasably clamped to the floatation unit of a marker buoy. The waterfowl decoy and anchor line are shown in phantom and are not part of the invention.

FIG. 16 Shows the fifth embodiment of anchor 20 of the invention releasably clamped onto the floatation unit 12 of a typical waterfowl decoy 36 in the storage position. Anchor 20, when used with waterfowl decoy 36, is of the same design as for use with marker buoy 10. The operation and use of anchor 20 are also the same for both marker buoy 10 and waterfowl decoy 36.

CONCLUSION

Marker buoy anchors and waterfowl decoy anchors are sometimes made of steel, but steel is rigid and does not allow the anchor to be easily bent and formed around a portion of the floatation unit of a marker buoy or waterfowl decoy to securely grip the marker buoy or decoy when not in use. This can often result is loose and tangled anchor line. Because it is easily bendable, lead is commonly used for marker buoy anchors and waterfowl decoy anchors. It can be configured to be readily formed around a portion of the marker buoy or waterfowl decoy when not in use, to secure the anchor to the marker buoy or decoy. This malleable quality of lead provides for convenient storage, and effectively prevents the unwanted release and tangling of anchor line.

While lead has this advantage over currently available steel anchors, lead is increasingly recognized as a serious pollutant of our land, water, and air. There is, therefore, a need for a non-lead anchor with the capability of clamping and holding onto the marker buoy or decoy when not in use. The reader can see that the various embodiments of this invention provide such an anchor that has the advantages of currently used lead anchors but do not require the use of lead.

While the above description contains many specifications, these should not be construed as limitations on the scope of the invention, but rather an exemplification of certain embodiments thereof. The embodiments described above merely illustrate principles of the invention and some possible variations in form. Other variations are possible. For example, it should be understood that the size and configuration of the anchor of this invention might vary widely depending upon the size and configuration of the specific marker buoy or waterfowl decoy used therewith. Also, in the above-described appended drawings, the attachment point for the anchor is the line storage spool of a marker buoy or the keel of a waterfowl decoy. Depending upon the configuration of the marker buoy or decoy with which the anchor is to be used, other attachment points may be more suitable for attaching the anchor for storage.

Workers skilled in the art will recognize additions, deletions, and other modifications that can be made in form and

I claim:

1. An anchor for use with a floatation unit of a marker buoy or waterfowl decoy wherein said floatation unit is attached to one end of an anchor line and said anchor is attached to the other end thereof, said anchor comprising a shell cover containing an anchor weight composed substantially of non-lead material, said anchor having sufficient weight and density to confine said floatation unit within a circular area of a water body surface, said circular area defined as having a radius of one-half of the deployed length of said anchor line, said circular area being centered on said water surface at a point directly above said anchor, said anchor being of a generally U-shaped configuration having an anchor body and a pair of spaced, opposed clamping arms integral with and extending outwardly from said U-shaped anchor, said anchor weight comprising a plurality of individual anchor weight segments, said individual anchor weight segments being substantially rounded and having generally smooth surfaces to allow said individual anchor weight segments to easily slide against adjacent surfaces of one another for the purpose of allowing said anchor and said arms to flex to open and close substantially, said anchor further comprising at least one stiffener bar, said stiffener bar being a bendable elongated element traversing through the interior of said anchor body and extending longitudinally through the interior of at least one-half of the length of said arms, said stiffener bar having the capability of allowing said anchor and said arms to be easily and repeatedly manually bent to clamp and hold onto said floatation unit, and to be easily and repeatedly unbent to allow the release of said anchor from said floatation unit, said arms also having a cross-section configuration with a least dimension thereof being coincident with a direction of bending of said arms in order to facilitate said arms to spread apart to open, and to close sufficiently to return to their normally substantially closed position in order to springably clamp and hold onto said floatation unit, thereby releasably attaching said anchor to said floatation unit to prevent unwinding and tangling of said anchor line, and for convenient storage of said floatation unit, said anchor line, and said anchor when not in use, said anchor further comprising an anchor line connection member fixedly attached thereto to securely attach said anchor line to said anchor.

2. The anchor of claim 1 wherein said stiffener bar comprises at least one spring, said spring being a resilient, elongated element traversing through the interior of said anchor body and extending longitudinally through the interior of at least one-half of the length of said arms, said spring having the capability of causing said anchor and said arms to easily and repeatedly spring together to, clamp and hold onto said floatation unit, and to be easily and repeatedly urged apart to allow the release of said anchor from said floatation unit.

3. The anchor of claim 1 wherein said shell cover is, itself, of flexibly resilient material capable of causing said anchor and said arms to easily and repeatedly spring together to clamp and hold onto said floatation unit, and to be easily and repeatedly urged apart to allow the release of said anchor from said floatation unit.

4. The anchor of claim 1 wherein said stiffener bar comprises a leaf spring.

* * * * *